United States Patent [19]
Ganse et al.

[11] Patent Number: 5,032,925
[45] Date of Patent: Jul. 16, 1991

[54] CIRCUIT FOR IDENTIFYING WHEN A REPRODUCED COLOR VIDEO SIGNAL HAS BEEN RECORDED IN A HIGH-BAND OR LOW-BAND MODE

[75] Inventors: Shigeru Ganse, Kanagawa; Hajime Enoki, Tokyo, both of Japan

[73] Assignee: Sony Corporation, Tokyo, Japan

[21] Appl. No.: 330,317

[22] Filed: Mar. 29, 1989

[30] Foreign Application Priority Data

Apr. 1, 1988 [JP] Japan ................. 63-80387

[51] Int. Cl.$^5$ ............ H04N 9/491; H04N 5/78
[52] U.S. Cl. ................... 358/310; 358/330; 360/27
[58] Field of Search ............ 358/310, 330, 324, 323, 358/12; 360/27, 28, 30, 68; 369/50, 48, 49, 47

[56] References Cited

U.S. PATENT DOCUMENTS 3,764,739 10/1973 Faroudja ............... 358/330
4,189,745 2/1980 Ushio et al. ........... 358/340
4,686,585 8/1987 Sato ..................... 360/27

FOREIGN PATENT DOCUMENTS

2170976 8/1986 United Kingdom ........... 358/329

Primary Examiner—Robert L. Richardson
Assistant Examiner—Huy Nguyen
Attorney, Agent, or Firm—Alvin Sinderbrand; William S. Frommer

[57] ABSTRACT

A recording mode identifying circuit is provided for use in a magnetic recording and/or reproducing apparatus capable of recording a color video signal in a first or low-band mode in which a luminance signal is recorded as a frequency modulation of a first carrier frequency and a second or high-band mode in which the luminance signal is recorded as a frequency modulation of a second carrier frequency. For avoiding erroneous identification of the mode with which the color video signal was recorded, a predetermined frequency component of a reproduced FM luminance signal which corresponds to the frequency of the carrier of one of the modes when modulated by a predetermined luminance signal level, for example, the frequency component of the lower sideband corresponding to the sync tip level in the low-band mode, is phase inverted, and an amplitude component of the resulting signal with phase inversion is eliminated and the mode with which the reproduced color video signal was recorded is determined by detecting the level of the predetermined frequency component, for example, corresponding to the sync tip level in the low-band mode.

10 Claims, 10 Drawing Sheets

FM SIGNAL COMPONENT

Fig. 8B

LSB-INVERTED SIGNAL COMPONENT

Fig. 8C

SIGNAL COMPONENT EQUIVALENTLY ADDED BY A LIMITER

Fig. 8D

LIMITER OUTPUT SIGNAL COMPONENT

FM SIGNAL COMPONENT

*Fig. 12B*

LSB2-INVERTED SIGNAL COMPONENT

*Fig. 12C*

SIGNAL COMPONENT EQUIVALENTLY ADDED BY A LIMITER

*Fig. 12D*

LIMITER OUTPUT SIGNAL COMPONENT

CIRCUIT FOR IDENTIFYING WHEN A REPRODUCED COLOR VIDEO SIGNAL HAS BEEN RECORDED IN A HIGH-BAND OR LOW-BAND MODE

BACKGROUND OF THE INVENTION

1. Field of the Invention

The present invention relates to a mode identifying circuit for use in a magnetic recording and/or reproducing apparatus capable of selective operation in a low-band mode and a high-band mode.

2. Description of the Prior Art

In a rotary VTR of the type in which a luminance signal is FM-modulated and a chroma signal is down-converted to a low frequency region for recording in slant tracks on a magnetic tape, horizontal resolution can be improved, and consequently high picture quality can be achieved, by increasing the carrier frequency that is frequency modulated by the luminance signal. Therefore, it has been recommended that a VTR be provided with a mode in which recording is carried out with a carrier frequency being used for frequency modulation with the luminance signal that is higher than the conventionally employed carrier frequency in such a VTR.

Thus, in the recording format of an 8-mm VTR, the carrier frequency for the FM modulation by the luminance signal is set conventionally to be 4.2 MHz at the sync tip level and 5.4 MHz at the white peak level, and it has been suggested that recording be performed with a high carrier frequency, that is, with a carrier frequency which is 5.7 MHz at the sync tip level and 7.7 MHz at the white peak level.

If such mode in which the carrier frequency for the frequency modulation by the luminance signal is increased, hereinafter called the "high-band mode", is to be selectively established in a VTR in addition to a conventionally employed mode which is hereinafter called the "low-band mode", in a reproducing operation of the VTR, it is necessary to change the characteristic of a luminance signal processing circuit in correspondence with the mode used when the tape was recorded. More specifically, it is necessary to change the sensitivity of an FM demodulator or a characteristic of a low-pass filter provided after the FM demodulator in accordance with whether the high-band mode or the low-band mode was used in recording the tape being played-back or reproduced. It is extremely troublesome to manually switch or change such characteristics of the VTR for the various modes, and, when changed manually, correct mode setting cannot be reliably achieved in the case where a mode transition occurs intermediate the ends of the tape.

For the above reasons, a VTR equipped with a mode identifying circuit has been proposed for automatically determining whether the video signal was recorded on the reproduced tape in the low-band mode or the high-band mode. Such a conventional mode identifying circuit detects a signal level of a predetermined frequency component which is concentrated in a recorded signal of one mode, and determines whether this detection level is equal to, or larger than a predetermined level as the basis for a mode identification.

Figure 1:
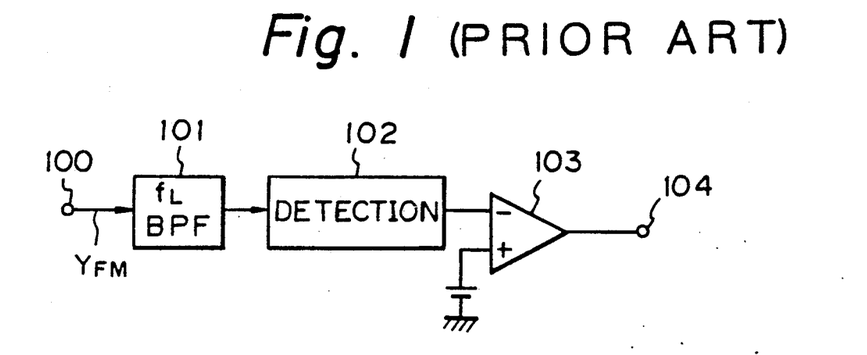
FIG. 1 is a block diagram of a conventional mode identifying circuit.

An example of such conventional mode identification circuit is shown in FIG. 1 in which a reproduced frequency modulated (FM) luminance signal $Y_{FM}$ is supplied from an input terminal 100 to a band-pass filter 101 which passes a frequency component of a frequency $f_L$ which is included in the FM luminance signal $Y_{FM}$ and corresponds, for example, to the sync tip level of the video signal when recorded in the low-band mode. It will be appreciated that the frequency component which corresponds to the carrier frequency $f_L$ of the FM luminance signal for the sync tip level of the reproduced FM luminance signal $Y_{FM}$ can be picked up when reproducing a low-band recording. The output of the band-pass filter 101 is supplied to a detector 102 which detects level of the frequency component corresponding to the $f_L$. The output of the detector 102 is applied to a negative input of a comparator 103 which receives a reference voltage at a positive input thereof. The comparator 103 detects whether the output level of the detector 102 is equal to or larger than the predetermined or reference voltage, and the resulting output of the comparator 103 is available at an output terminal 104 as a mode identifying output.

With the above-described example, if the reproduced FM luminance signal $Y_{FM}$ supplied to the input terminal 100 is a low-band signal, the output level of the detector 102 becomes equal to or greater than the predetermined or reference voltage. As a result, the output of the comparator 103 assumes a negative or low level. When the reproduced FM luminance signal supplied to the input terminal 100 is a high-band signal, it is intended that no signal equal to or larger than the reference voltage is detected at the detector 102, and that, as a result thereof, the output of the comparator 103 will assume a high level for identifying the high-band signal.

Figure 2:
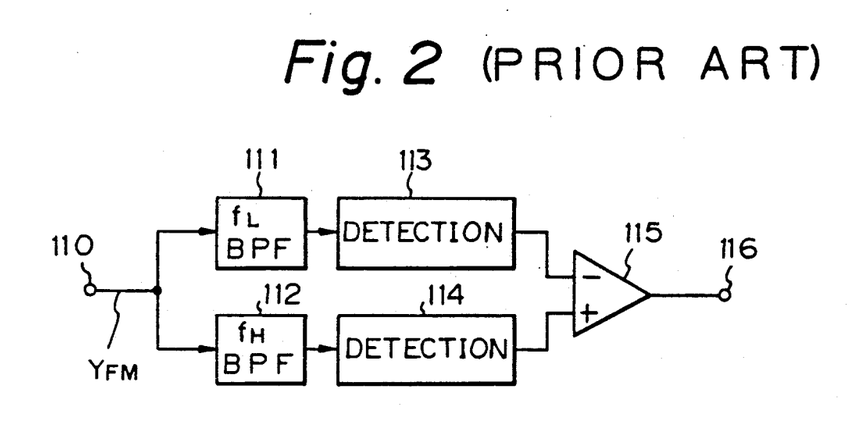
FIG. 2 is a block diagram of another conventional mode identifying circuit.

FIG. 2 shows another example of a conventional mode identifying circuit in which the reproduced FM luminance signal is applied from an input terminal 110 to a band-pass filter 111 which, for example, passes the frequency component $f_L$ corresponding to the sync tip level in the case of the low-band mode, and also to a band-pass filter 112 which, for example, passes a frequency component $F_h$ corresponding to the sync tip level in the case of the high-band mode. The output of the band-pass filter 111 is supplied to a detector 113, and the output of the detector 113 is applied to a negative input of a comparator 115. The output of the band-pass filter 112 is supplied to a detector 114, and the output of the detector 114 is applied to a positive input of the comparator 115. The resulting output of the comparator 115 is made available at an output terminal 116 as a mode identifying signal.

If the reproduced FM luminance signal supplied to the input terminal 110 is a low-band signal, usually the output level of the detector 113 is larger than the output level of the detector 114 so that the output of the comparator 115 is a negative or low level signal for identifying the low-band signal. When the reproduced FM luminance signal $Y_{FM}$ is a high-band signal, usually the output of the detector 114 is larger than the output of the detector 113 and, therefore, the output of the comparator 115 is at a high level to identify the high-band signal.

However, if the signal level of a predetermined frequency component concentrated in a reproduced FM luminance signal $Y_{FM}$ which had been recorded in a low-band mode, or the signal level of a predetermined frequency component concentrated in a reproduced FM luminance signal $Y_{FM}$ which had been recorded in a high-band mode is detected, as in FIGS. 1 and 2, and the reproducing mode is switched or changed-over in response to such detected level, there is a possibility that an erroneous mode identification will occur due to the influence of sideband components.

More specifically, in the conventional mode identifying circuit shown in FIG. 1, it is intended that an output equal to or greater than a predetermined value is obtained from the detector 102 only if the reproduced FM luminance signal $Y_{FM}$ was recorded in the low-band mode, whereas, if the reproduced FM luminance signal $Y_{FM}$ was recorded in the high-band mode, it is assumed that the output from the detector 102 will be clearly less than the predetermined value represented by the reference voltage supplied to the positive input of the comparator 103. However, in actual practice, even if the reproduced FM luminance signal $Y_{FM}$ was recorded in the high-band mode, its lower sideband may coincide with, or include the carrier frequency corresponding to the sync tip level of the low-band mode. In this case, a frequency component of the lower sideband is passed by the band-pass filter 101, and a signal equal to or greater than the predetermined level may be detected at the detector 102. Therefore, the output of the comparator 103 may assume a low level despite the fact that the reproduced FM luminance signal $Y_{FM}$ was recorded in the high-band mode, and it is erroneously indicated that the video signal being reproduced was recorded in the low-band mode.

Similarly, in the mode identifying circuit shown in FIG. 2, even when the reproduced FM luminance signal $Y_{FM}$ was recorded in the high-band mode, its lower sideband may be in the vicinity of the frequency $f_L$ characteristic of the carrier frequency for the sync tip level in the low-band mode and which is a pass band of the band-pass filter 111, and, if the level of the lower sideband at the frequency $f_L$ is larger than the level of the carrier at the frequency $f_H$, the output level of the detector 113 is larger than that of the detector 114. As a result, the output of the comparator 115 assumes a low level so that there is an erroneous indication of the low band mode.

Figure 3:
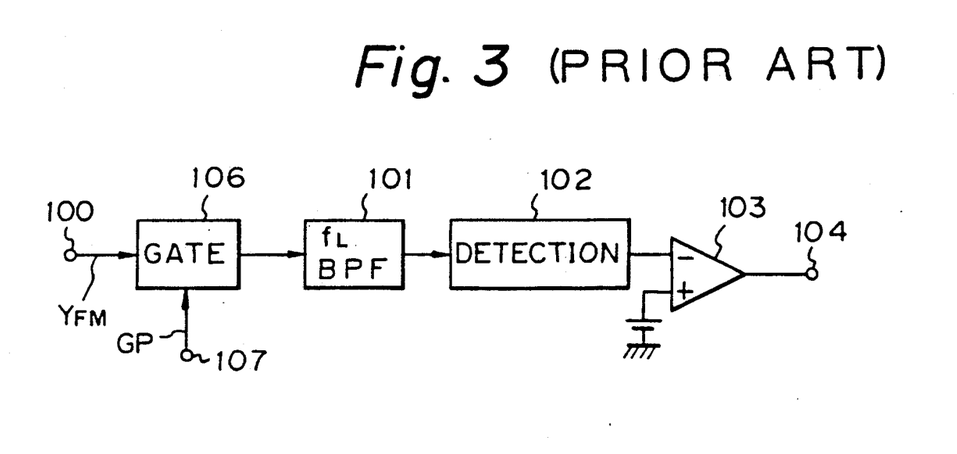
FIG. 3 is a block diagram of still another conventional mode identifying circuit.

In order to prevent such erroneous mode indication, it has been proposed, for example, as shown in FIG. 3, to provide a gate circuit 106 between the input terminal 100 and the band pass filter 101 in FIG. 1 for transmitting the reproduced FM luminance signal only during each synchronization signal interval in response to a gating pulse GP suitably supplied to a terminal 107. Thus, the reproduced FM luminance signal $Y_{FM}$ is applied to the band pass filter 101 only during each synchronization signal interval through the gate circuit 106, and a predetermined frequency component of the reproduced FM luminance signal $Y_{FM}$ during each synchronization signal interval is detected for identifying the mode used for recording the reproduced video signal.

Since the level of the luminance signal is constant during each synchronization interval, the carrier of the FM luminance signal during each synchronization signal interval has a predetermined frequency and its sideband components are spread in a predetermined manner. As a result, by thus detecting the predetermined frequency component in the reproduced FM luminance signal $Y_{FM}$ only during each synchronization interval for identifying the recording mode, only a carrier component of the low-band mode can be detected, and an erroneous mode identification due to influence of the lower sideband component of a reproduced FM luminance signal recorded in the high-band mode can be prevented.

However, in order to detect the reproduced FM luminance signal $Y_{FM}$ only during the synchronization signal interval, it is necessary to develop the gate pulse GP corresponding to the synchronization period and supply the gate pulse GP to the terminal 107. The foregoing requires separation of a synchronization signal from a demodulated and reproduced luminance signal for the development of the gate pulse GP. However, an FM demodulator for demodulating the reproduced FM luminance signal $Y_{FM}$ cannot produce a correct demodulated output unless the demodulator is properly set in conformance with the mode used in recording. For this reason, at a time when the recording mode has not yet been identified, the synchronization signal cannot be separated from the reproduced FM luminance signal $Y_{FM}$ and the gate pulse GP cannot be readily formed.

OBJECTS AND SUMMARY OF THE INVENTION

Accordingly, it is an object of this invention to provide a mode identifying circuit which avoids the above-described problems inherent in the prior art.

More specifically, it is an object of this invention to provide a mode identifying circuit capable of correctly determining whether a reproduced video signal was recorded in the high-band mode or the low-band mode.

Another object is to provide an apparatus for reproducing a color video signal recorded in the high-band mode or the low-band mode, and which has a mode identifying circuit for correctly determining the mode used in recording the reproduced signal, and for changing-over processing circuits of the apparatus so as to accommodate the identified recording mode.

In accordance with an aspect of this invention, a recording mode identifying circuit, for example, for use in a magnetic recording and/or reproducing apparatus capable of recording a color video signal in a first or low-band mode in which a luminance signal is recorded as a frequency modulation of a first carrier frequency and a second or high-band mode in which the luminance signal is recorded as a frequency modulation of a second carrier frequency; comprises a phase inverter for inverting a predetermined frequency component of a reproduced FM luminance signal which corresponds to the frequency of the carrier of one of the modes when modulated by a predetermined luminance signal level, for example, the frequency component of the lower sideband corresponding to the sync tip level in the low-band mode, a limiter eliminating an amplitude component of the output of the phase inverter, and a level detector for detecting a level of said predetermined frequency component in the reproduced FM luminance signal which has had said predetermined frequency component inverted and said amplitude component eliminated, whereby the mode with which the reproduced signal was recorded is determined from the level detected by said level detector.

In a desirable embodiment of the invention, the phase inverter includes band-pass filter means receiving said reproduced FM luminance signal and adapted to pass said predetermined frequency component thereof, amplifying means receiving said predetermined frequency component passed by said band pass filter means and operative to effect a two-fold amplification thereof, and subtracting means for subtracting the two-fold or doubly amplified predetermined frequency component from said reproduced FM luminance signal and, as a result thereof, providing the reproduced FM luminance signal with the phase of said predetermined frequency component inverted therein.

In a particular example in which the recording mode is identified from the level of a frequency component of the reproduced FM luminance signal corresponding to the carrier frequency $f_1$ for a sync tip level recorded in a low-band mode; the phase of the component of the frequency $f_1$ of the reproduced FM luminance signal is inverted and its amplitude component is eliminated. In such case, if the lower sideband of the high-band mode includes the frequency $f_1$, the lower sideband of the high-band mode at the frequency $f_1$ is suppressed. In this way, the level of the frequency component $f_1$ of the reproduced FM luminance signal whose lower sideband in the high-band mode is suppressed at the frequency $f_1$ is detected for identifying the recording mode. Since the lower sideband in the high-band mode at the frequency $f_1$ is suppressed, an erroneous identification of the mode due to the influence of sideband components can be prevented.

The above, and other objects, features and advantages of the invention, will be apparent in the following detailed description which is to be read in connection with the accompanying drawings.

DESCRIPTION OF THE PREFERRED EMBODIMENTS

Various aspects of an embodiment of this invention will now be described under the following headings in the order named:

a. Structure of a VTR reproducing system to which the invention is applied
b. Explanation of operating principles of an example of a mode identifying circuit embodying the invention
c. Structure of one example of the mode identifying circuit
d. General arrangement of a phase inverting circuit
e. Particular structure of the phase inverting circuit
f. Examples of application of the invention.

a. Structure of a VTR reproducing system to which the invention is applied

The present invention is desirably applied to a VTR in which a video signal recorded with a high-band, or a video signal recorded with a low-band can be selectively reproduced.

Figure 4A:
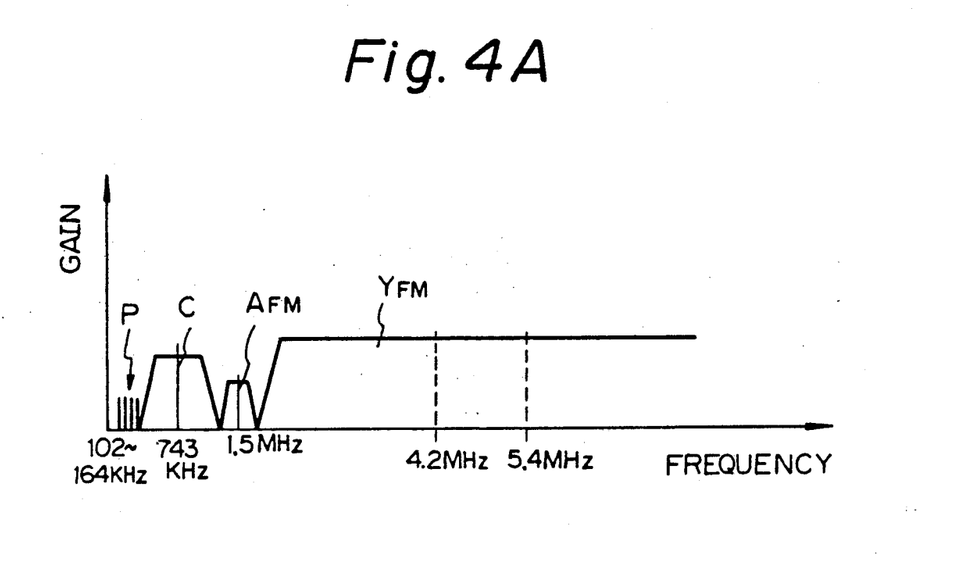
FIGS. 4A and 4B show frequency spectra for recording in the low-band and high-band modes, respectively.
Figure 4B:
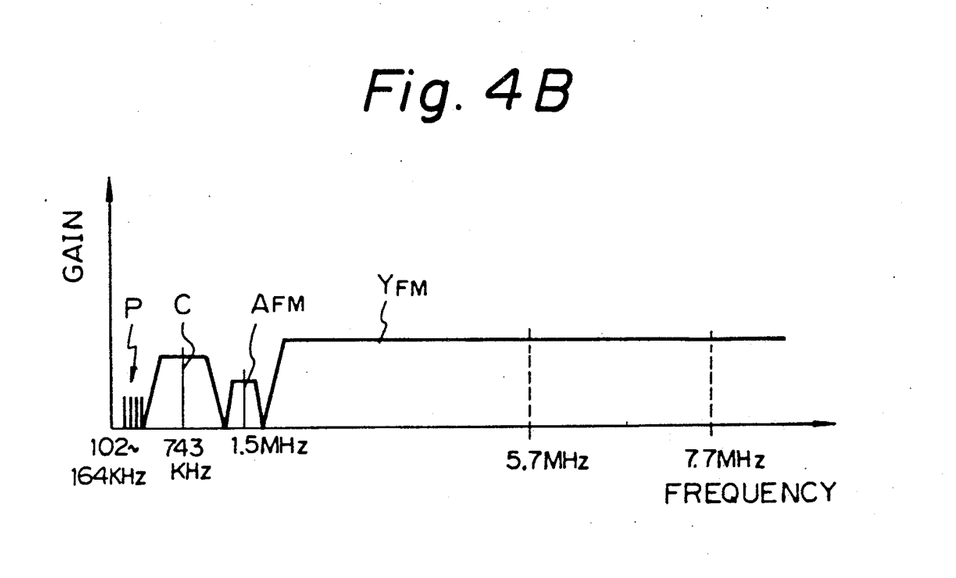

FIG. 4A is a spectrum of a signal recorded in a low-band mode in an 8-mm VTR, and FIG. 4B is a spectrum of a signal recorded in a high-band mode in an 8-mm VTR. In FIGS. 4A and 4B, $Y_{FM}$ is an FM-luminance signal, C is a so-called down-converted chroma signal, $A_{FM}$ is an FM-audio signal, and P is the spectrum of pilot signals for ATF tracking. In the low-band mode, the carrier frequency of the FM luminance signal $Y_{FM}$ is selected so that, as shown in FIG. 4A, a frequency of 4.2 MHz corresponds to the sync tip level and a frequency of 5.4 MHz corresponds to the white peak level. In the high-band mode, as shown in FIG. 4B, the carrier frequency is selected so that the sync tip level is at a frequency of 5.7 MHz and the white peak level is at a frequency of 7.7 MHz. In both the low-band mode and the high-band mode, the center frequency of the down-converted chroma signal is selected to be 743 kHz, and a center frequency of the FM audio signal $A_{FM}$ is selected to be 1.5 MHz.

Figure 5:
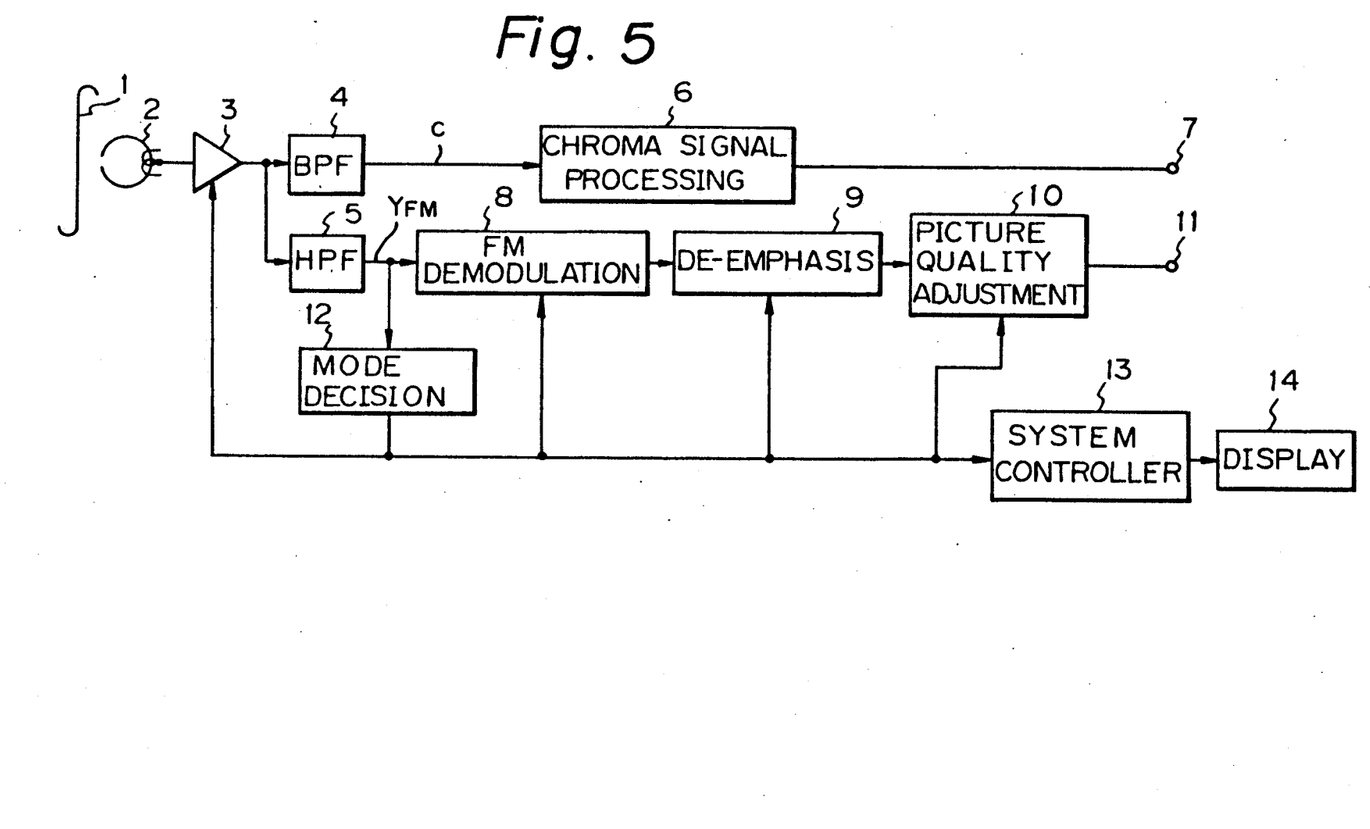
FIG. 5 is a block diagram showing a VTR reproducing system to which an embodiment of the invention is applied.

Referring now to FIG. 5, it will be seen that, in a reproducing system for a video signal in a VTR to which the present invention may be applied, a signal recorded on a magnetic tape 1 is reproduced by a conventionally rotated head 2, and the reproduced signal is supplied to a regenerative amplifier 3 through a rotary transformer (not shown). The output of the regenerative amplifier 3 is supplied to a band-pass filter 4 and a high-pass filter 5. A reproduced down-converted chroma signal C is obtained from the output of the band-pass filter 4, and a reproduced FM luminance signal $Y_{FM}$ is obtained from the output of the high-pass filter 5.

The reproduced down-converted chroma signal C is supplied to a chroma signal processing circuit 6 in which, for example, time-axis variations of the reproduced signal and crosstalk components are eliminated in a conventional manner. Further, in the processing circuit 6, reproduced down-converted chroma signal C is returned to a chroma signal having a standard subcarrier frequency, for example, of 3.58 MHz. A processed chroma signal is supplied from the output of the chroma signal processing circuit 6 to an output terminal 7 therefor.

A reproduced FM luminance signal $Y_{FM}$ obtained from the band-pass filter 5 is supplied to an FM demodulator 8 where a luminance signal is demodulated therefrom. The output of the demodulator 8 is supplied through a de-emphasis circuit 9 and a picture-quality adjusting circuit 10 to a respective output terminal 11.

In The VTR of FIG. 5, as mentioned before, it is possible to establish recording in a high-band mode in which the picture quality is improved through the use of an increased carrier frequency at the time of frequency modulation of a luminance signal, or to effect recording in the usual low-band mode. The FM luminance signal $Y_{FM}$ separated by the high pass filter 5 from the signal reproduced from the magnetic tape 1 is supplied to a mode identifying circuit 12 embodying this invention. The mode identifying circuit 12 determines whether the signal being reproduced from the magnetic tape was recorded in the high-band mode or the low-band mode. The output of the circuit 12 which identifies the recording mode is supplied to the regenerative amplifier 3, the FM demodulator 8, the de-emphasis circuit 9, and the picture-quality-adjusting circuit 10, respectively, for controlling or changing-over the regenerative amplifier 3, FM demodulator 8, de-emphasis circuit 9, and picture-quality-adjusting circuit 10 so that the characteristics thereof will at all times be suitable to accommodate the reproduced signal whether the latter was recorded in the low-band mode or the high-band mode as indicated by the output from the mode identifying circuit 12.

Further, the output of the mode identifying circuit 12 is supplied to a system controller 13, for example, in the form of a micro-processor. An output of the system controller 13 is applied to a display unit 14, so that the mode in which the signal was recorded on the magnetic tape 1 being played-back or reproduced is displayed on the display unit 14. On the basis of such display, a user can readily ascertain which recording mode was employed for the recording of the magnetic tape 1 being reproduced.

b. Explanation of operating principles of an example of a mode identifying circuit embodying the invention The mode identifying circuit 12 for determining whether the signal being reproduced from the tape 1 was recorded in the high-band mode or the low-band mode relies for its operation on the fact that the carrier frequencies are different for recording in the low-band mode and for recording the high-band mode.

In one embodiment of the mode identifying circuit 12 according to the invention, the level of a frequency component of the reproduced FM luminance signal having a frequency $f_1$ corresponding to the sync tip level at the time of low-band recording is detected and the mode identification is effected on the basis of whether the frequency component of the frequency $f_1$ is equal to or larger than a predetermined level. However, as earlier noted, in such case, it is necessary to avoid the erroneous mode identification which may occur when the frequency range of the lower sideband of the FM luminance signal recorded in high-band mode includes the frequency $f_1$.

Therefore, in an embodiment of the present invention, the lower sideband component of the frequency $f_1$ present in the reproduced FM luminance signal which was recorded in the high-band mode is substantially eliminated, whereupon the level of the component of the frequency $f_1$ can be detected with the possibility of error. Generally, in accordance with this invention, the lower sideband component of the frequency $f_1$ in a reproduced FM luminance signal which was recorded in the high-band mode is suppressed by inverting the phase of the component of the frequency $f_1$ and eliminating a resulting amplitude component by a limiter.

Figure 6:
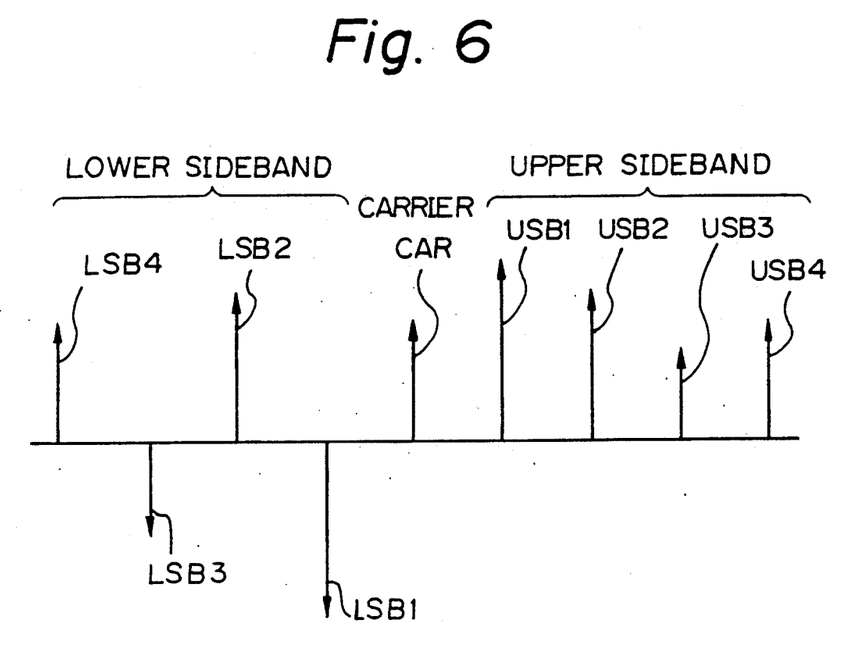
FIG. 6 is a spectrum diagram to which reference is made in explaining characteristics of an FM signal.

In other words, an FM signal may be represented as follows:

$$f(t) = A_0[J_0(m_f) \sin \omega_0 t$$

$$+ J_1(m_f)(\sin(\omega_0+p)t - \sin(\omega_0-p)t)$$

$$+ J_2(m_f)(\sin(\omega_0+2p)t + \sin(\omega_0-2p)t)$$

$$+ J_3(m_f)(\sin(\omega_0+3p)t - \sin(\omega_0-3p)t)$$

$$+ \ldots ]$$

wherein:
$\omega_0$: angular velocity of the carrier
p: angular velocity of a signal wave
$m_f$: modulation index From the above equation, an FM signal can be represented by a spectrum diagram as shown in FIG. 6, and in which the sidebands spread upward and downward from the carrier CAR as a center. Among these sideband components, the first-order sidebands LSB1 and USB1, and the third-order sidebands LSB3 and USB3, which are sidebands of an odd-number order, are made so that their upper sidebands and lower sidebands are inverted in respect to one another. The second-order sideband components LSB2 and USB2 and the fourth-order sideband components LSB4 and USB4, which are sidebands of an even-number order, are made so that their upper sidebands and lower sidebands have the same phase as each other.

Figure 7:
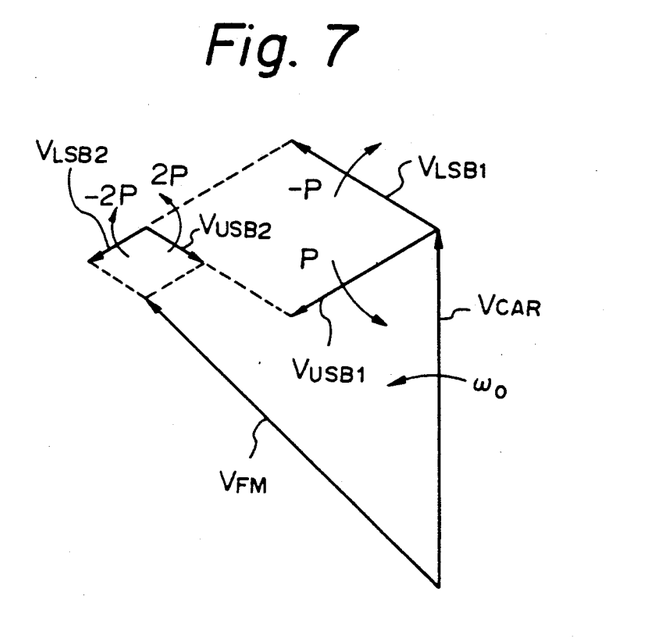
FIG. 7 is a vector diagram to which reference is made in further explaining the FM signal.

Furthermore, from the above equation, the FM signal may be represented by the vector diagram of FIG. 7 which shows an FM signal vector $F_{FM}$ over its second-order sideband component. In FIG. 7, a carrier vector $V_{car}$ is rotated with the angular velocity $\omega_0$; a first-order upper sideband vector $V_{USB1}$ is rotated with the angular velocity p; a first-order lower sideband vector $V_{LSB1}$ is rotated with an angular velocity $-p$; a second-order upper sideband vector $V_{USB2}$ is rotated with an angular velocity $2p$, and a second-order lower sideband vector $V_{LSB2}$ is rotated with an angular velocity $-2p$.

Figure 8A:
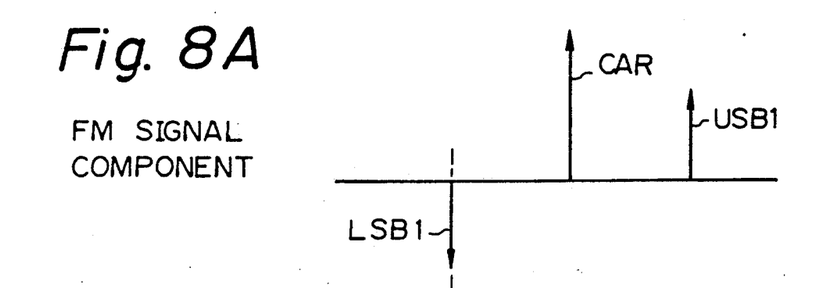
FIGS. 8A–8D are spectra diagrams to which reference will be made in explaining operating principles of the present invention.

It is assumed, for example, as shown on FIG. 8A, that the first-order lower sideband LSB1 of the high-band mode coincides with the frequency $f_1$ for the purposes of this explanation of how the first-order sideband LSB1 with the frequency $f_1$ can be suppressed by eliminating an amplitude component after inverting the component of the frequency $f_1$. Similar explanations can be provided for the cases where the lower sidebands LSB1, LSB3, LSB5, respectively, of an odd-number order coincide with the frequency $f_1$.

It is further assumed, as shown in FIG. 8A, that the first-order sidebands LSB1 and USB1 of the FM signal are inverted with respect to each other.

Figure 8B:
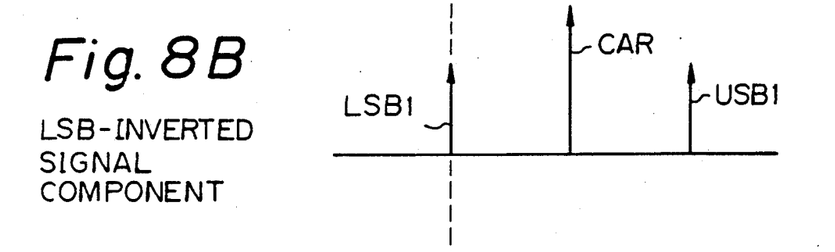

When the phase of the first-order lower sideband LSB1 of the FM signal shown in FIG. 8A is inverted, the first-order upper sideband USB1 has the same phase as the lower first-order lower sideband LSB1 as shown in FIG. 8B. As a result, by inverting the first-order sideband LSB1, an AM component is derived from the first-order sideband component.

Figure 8C:
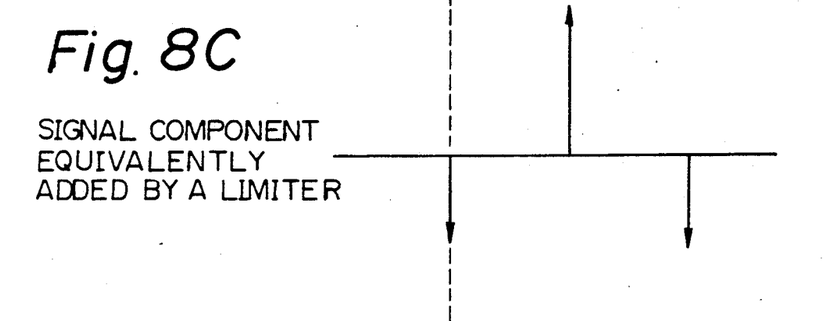
Figure 8D:
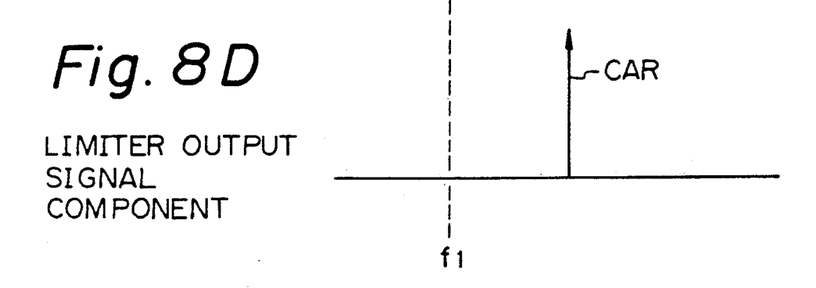

Such an AM component can be eliminated through amplitude limitation by a limiter. More specifically, when a signal with the spectrum shown in FIG. 8B is applied to the limiter, and the AM component shown in FIG. 8C is added equivalently, the upper sideband USB1 and the lower sideband LSB1 are suppressed, as shown in FIG. 8D.

The foregoing will be described in detail with reference to FIGS. 9, 10 and 11.

As mentioned above, the carrier vector $V_{CAR}$ is rotated with the angular velocity $\omega_o$, the first-order upper sideband vector $V_{USB1}$ is rotated with the angular velocity p, and the first-order lower sideband $V_{LSB1}$ is rotated with the angular velocity $-p$. As a result, the vector diagram of the FM signal over the first-order sideband at each of times $t_1$ to $t_4$ is as shown in FIG. 9. It is to be noted that for facilitating understanding, only the first-order upper sideband vector $V_{USB1}$ and the first order lower sideband $V_{LSB1}$ are shown to be rotated and the carrier vector $V_{CAR}$ is shown in a fixed position in the drawing, that is, not rotated.

Figure 9:
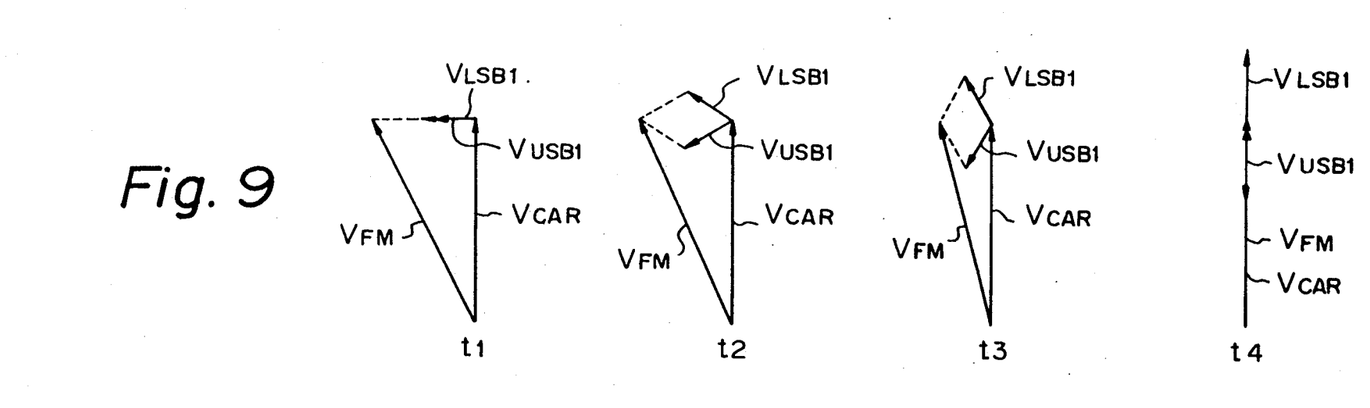
FIGS. 9, 10 and 11 are vector diagrams to which further reference will be made in explaining the operating principles of the invention.

As shown in FIG. 9, the length of the FM signal vector $V_{FM}$ hardly varies at the time $t_1$ to $t_4$ when the first-order sideband vectors $V_{LSB1}$ and $V_{USB1}$ are small. In other words, the amplitude of the FM signal barely changes.

Figure 10:
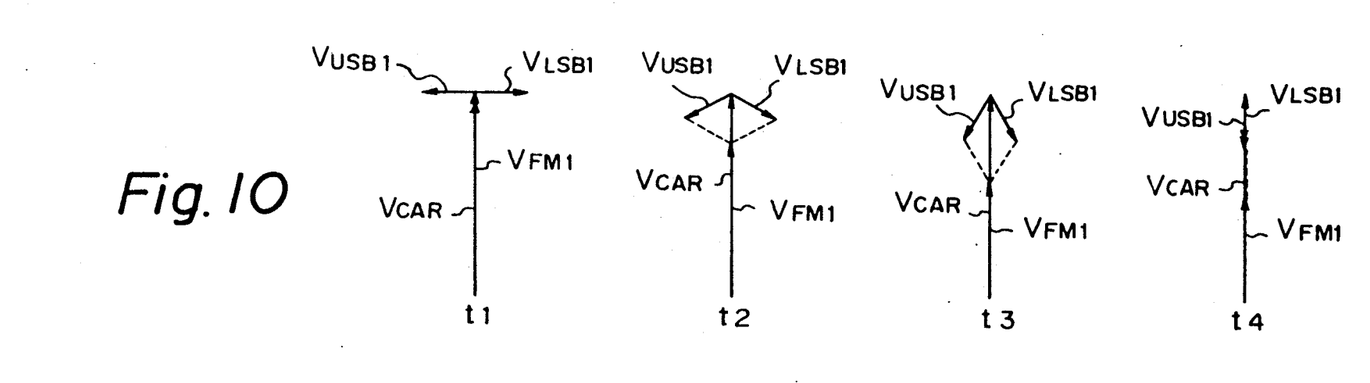

On the other hand, when the first-order lower sideband LSB1 is inverted, the vector $V_{FM1}$ of a signal at each of the times $t_1$ to $t_4$ has an amplitude component that is substantially influenced by the first-order sideband, as indicated in FIG. 10. In other words, the length of the signal vector $V_{FM1}$ is different at each of the times $t_1$ to $t_4$.

Figure 11:
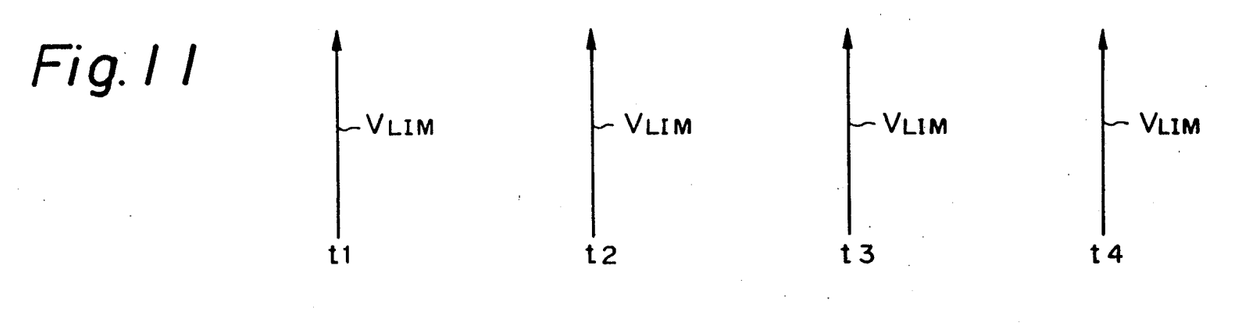

With the elimination of the amplitude component of this signal by means of the limiter, a shown in FIG. 11, the first-order upper sideband USB1 and the inverted first-order lower sideband LSB1 are eliminated so as to provide only a vector $V_{LIM}$ corresponding to a carrier vector CAR.

Next, it will be explained how the second-order sideband LSB2 present in the frequency $f_1$ can be suppressed by eliminating an amplitude component after inversion of the component of the frequency $f_1$ when the second-order lower sideband LSB2 of the signal recorded with high-band mode coincides with the frequency $f_1$. Similar explanations can be provided for the cases where the lower sidebands of an even-number order LSB2, LSB4 . . . coincide with the frequency $f_1$.

Figure 12A:
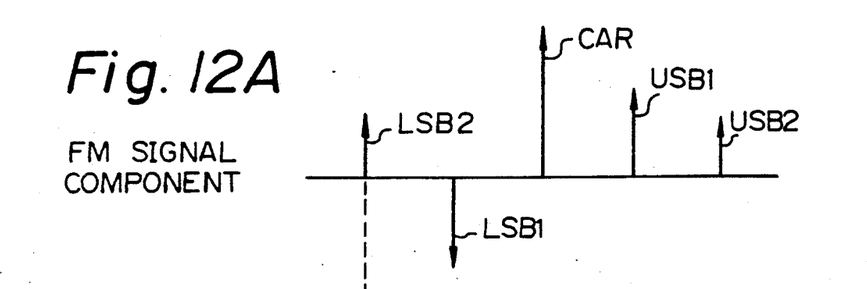
FIGS. 12A–12D are spectra diagrams to which reference will be made in further explaining the principles of the invention.

It is assumed for the purpose of this explanation that the second-order sideband LSB2 of the FM signal coincides with the frequency $f_1$, and that the second-order sidebands LSB2 and USB2 of the FM signal have the same phase, as shown in FIG. 12A.

Figure 12B:
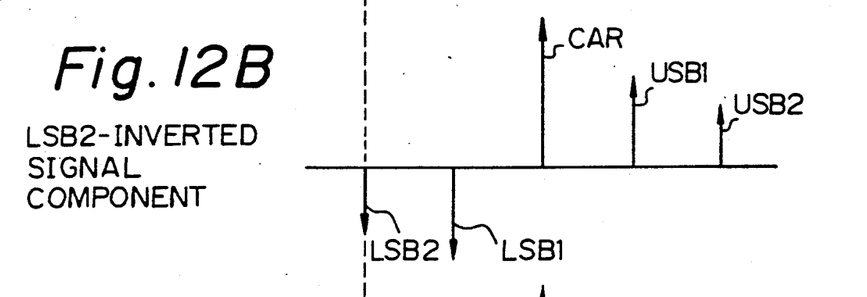
Figure 12C:
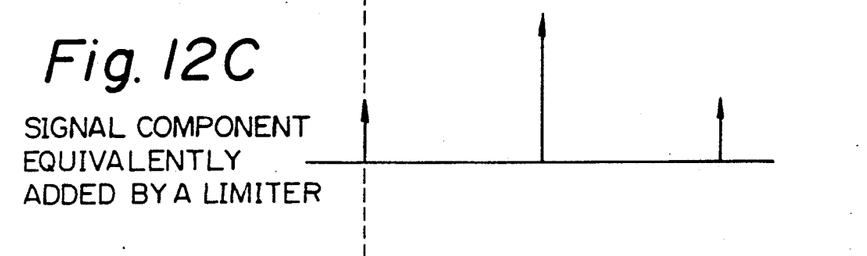
Figure 12D:
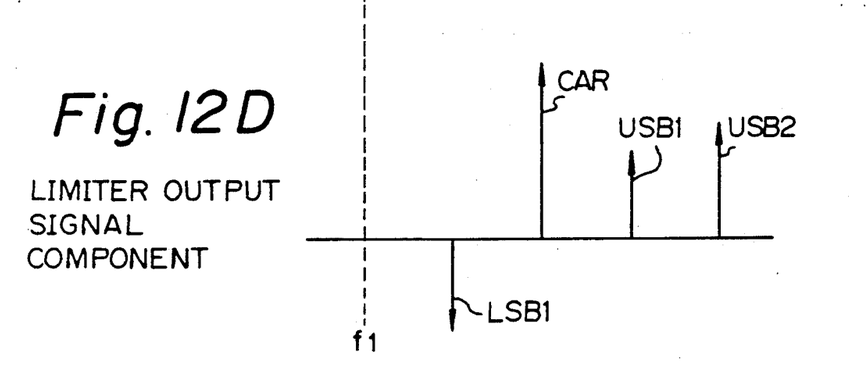

Upon inversion of the second-order lower sideband LSB2 at the frequency $F_1$, the upper sideband USB2 and the lower sideband LSB2 have inverted phases with respect to each other. As a result, an amplitude component appears in the FM signal which is supplied to the limiter. In such limiter, a component shown in FIG. 12C is added equivalently. Upon the equivalent addition of the signal having the spectrum shown in FIG. 12C to the signal with the spectrum indicated in FIG. 12B, a signal with the spectrum shown in FIG. 12D is provided. Clearly, as shown in FIG. 12D, the second-order lower sideband LSB2 is canceled and the second-order upper sideband USB2 is increased twofold.

Figure 13:
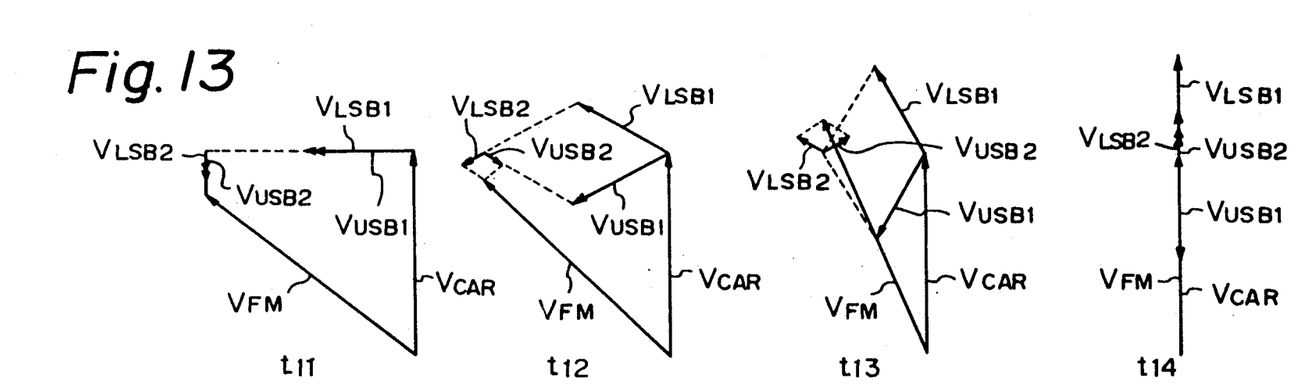
FIGS. 13, 14 and 15 are vector diagrams to which reference is made in explaining operating principles of the invention.

The foregoing will be described in detail below with the reference to vector diagrams shown in FIGS. 13, 14 and 15:

The FM signal over tis second-order sideband may be represented by the vector diagram of FIG. 13, in which the carrier vector $V_{CAR}$ is shown not rotated for facilitating understanding, thereof. As is apparent from FIG. 13, the amplitude of the FM signal vector $V_{FM}$ hardly varies at the times $t_{11}$ to $t_{14}$.

Figure 14:
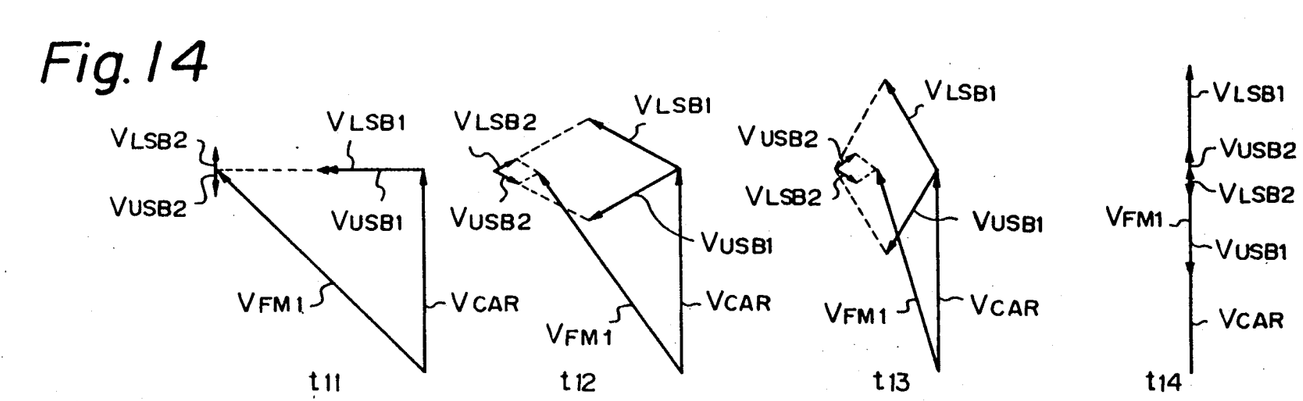
Figure 15:
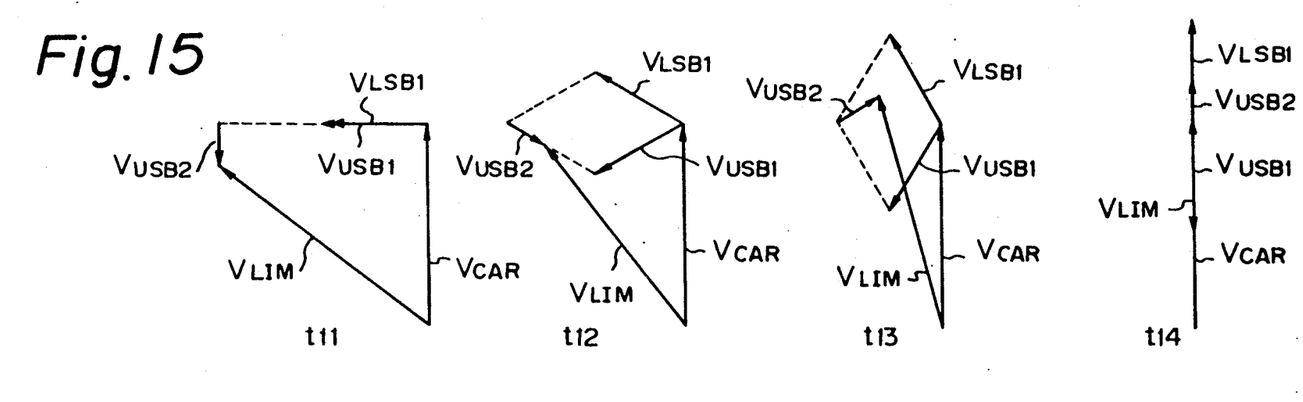

Upon the inverting of the second-order lower sideband vector $V_{LSB2}$ of the FM signal shown in FIG. 13, the signal vector $V_{FM1}$ becomes as shown in FIG. 14. More specifically, when the second-order lower sideband vector $V_{LSB2}$ of the FM signal shown in FIG. 13 is inverted, the vector $V_{FM}$ of a signal at the times $t_{11}$ to $t_{14}$ has an amplitude component since the lengths of the signal vector $V_{FM1}$ at the times $t_{11}$ to $t_{14}$, respectively, are different from each other.

The signal represented in FIG. 14 is supplied to the limiter for the elimination of its amplitude component. In other words, as shown in FIG. 15, an amplitude component is added so that a signal vector $V_{LIM}$ at each of the times $t_{11}$ to $t_{14}$ becomes almost constant. As a result, as indicated in FIG. 15, the second-order lower sideband vector $V_{LSB2}$ is canceled and the second order upper sideband $V_{USB2}$ is increased twofold.

c. Structure of one example of the mode identifying circuit

As earlier stated, the mode identifying circuit 12 suppresses a sideband component having the frequency $f_1$ by inverting a signal component of the frequency corresponding to the sync tip level of the low-band mode, for example, and eliminating an amplitude component by means of a limiter, and then detects the signal level of the frequency $f_1$ as the basis for identifying the recording mode.

Figure 16:
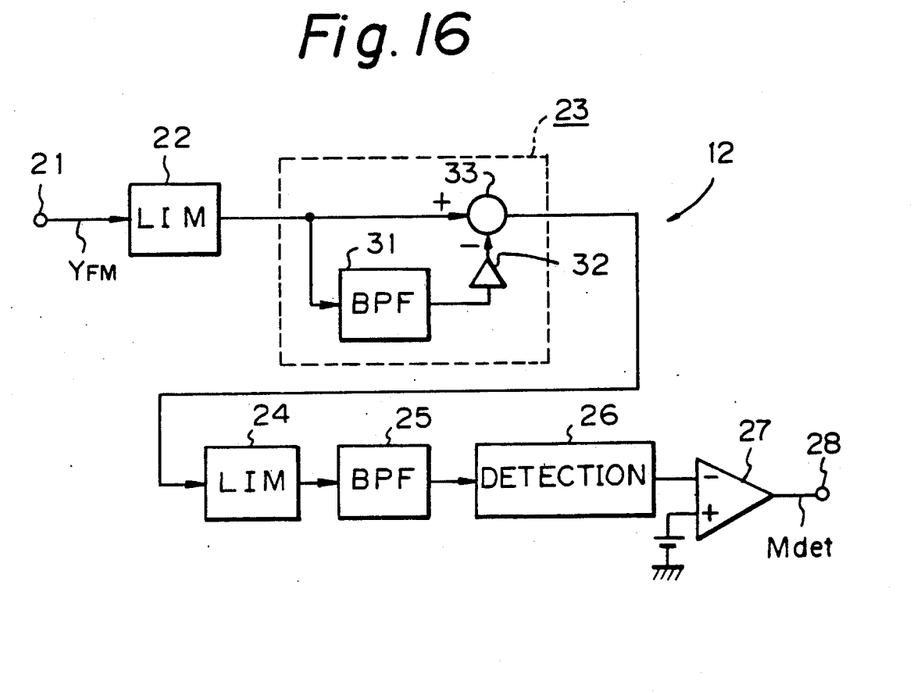
FIG. 16 is a block diagram showing a mode identifying circuit according to one embodiment of this invention.

In the mode identifying circuit 12 shown in FIG. 16, a reproduced M luminance signal $Y_{FM}$ is supplied from an input terminal 21 through a limiter 22 to a phase inverting circuit 23. The phase inverting circuit 23 inverts only the phase of a predetermined frequency $f_1$, for example, the phase of a component having the frequency corresponding to the sync tip level in the low-band recording mode. Of course, the pedestal level may be used instead of the sync tip level.

The output of the phase inverting circuit 23 is supplied to a limiter 24 in which amplitude components of the output of the phase inverting circuit 23 are eliminated. The output of the limiter 24 is supplied to a band-pass filter 25.

In the case where the component of the frequency $f_1$ is a sideband, a circuit for suppressing such sideband is constituted by the phase inverting circuit 23 and the limiter 24. When the lower sideband of a reproduced video signal which was recorded in the high-band mode includes the frequency $f_1$, such lower sideband is suppressed by the phase inverting circuit 23 and the limiter 24.

The band-pass filter 25 permits passage of a component of a predetermined frequency, for example, the frequency $f_1$ corresponding to the sync tip level when recording with low-band mode. The output of the band-pass filter 25 is supplied to a detector 26 which detects the level of the component of the frequency $f_1$ of the reproduced FM luminance signal $Y_{FM}$ through the limiter 22, the phase inverting circuit 23 and the limiter 24.

The output of the detector 26 is applied to a negative input of a comparator 27. The comparator 27 detects whether the component level of the frequency $f_1$ of the reproduced FM luminance signal $Y_{FM}$ obtained through the limiter 22, the phase inverting circuit 23, the limiter 24 and then band-pass filter 25 is equal to or larger than a predetermined or reference level established by a reference voltage applied to a positive input of the comparator 27. The output of the comparator 27 is applied to an output terminal 28 as a mode identifying signal $M_{det}$.

As noted above, the circuit for suppressing the sideband of the frequency $f_1$ is composed of the phase inverting circuit 23 and the limiter 24. More particularly, the component of the frequency $f_1$ is suppressed by the phase inverting circuit 23 and the limiter 24 when the component of the frequency $f_1$ of the reproduced FM luminance signal is the lower sideband of the signal recorded in the high-band mode. As a result, only a carrier component of the frequency $f_1$ of the reproduced FM luminance signal $Y_{FM}$ which corresponds to the low-band sync tip has its detected at the detector 26.

In the case where a reproduced video signal was recorded in the low-band mode, the carrier component of the frequency $f_1$ corresponding to the sync tip level of the low-band mode is produced and passes through the band-pass filter 25 so that the output level of the detector 26 is equal to or larger than the predetermined level of the reference voltage applied to the positive input of the comparator 27. Thus, the mode identifying signal $M_{det}$ is at a low or negative level when the reproduced video signal was recorded in the low-band mode. When the reproduced video signal was recorded in the high-band mode, the output level of the detector 26 becomes substantially less than the predetermined value even if the lower sideband component of the frequency $f_1$ lies in the reproduced FM modulation luminance signal $Y_{FM}$. The foregoing is because the lower sideband of the FM luminance signal recorded in the high-band mode is suppressed by the phase inverting circuit 23 and the limiter 24. Therefore, the output $M_{det}$ of the comparator 27 is reliably at a high level when the reproduced video signal was recorded in the high-band mode.

d. General arrangement of the phase inverting circuit

The phase inverting circuit 23 may be composed of a band-pass filter 31, an amplifier 32, and a subtracting circuit 33, for example, as shown in FIG. 16. The band-pass filter 31 has a characteristic which passes a predetermined frequency component, for instance, a frequency component of the frequency $f_1$ corresponding to the sync tip level, or alternatively to the pedestal level, when recording in low-band mode. The amplifier 32 has a gain of 2.

The reproduced FM luminance signal, after being limited by the limiter 22, is supplied to a positive input of the subtracting circuit 33 and through the band-pass filter 31 to the amplifier 32. The component of the predetermined frequency $f_1$ of the reproduced FM luminance signal is passed by the band-pass filter 31, and the component of the frequency $f_1$ is then doubly amplified by the amplifier 32. The doubly or two-fold amplified component of the frequency $f_1$ is supplied to an inverted input of the subtracting circuit 33.

Components of the reproduced FM luminance signal $Y_{FM}$ of frequencies other than the frequency $f_1$ are output directly, that is, without alteration, through the subtracting circuit 33. The component of the reproduced FM luminance signal $Y_{FM}$ having the frequency $f_1$ is directly supplied to the subtracting circuit 33, and also amplified doubly by the amplifier 32 before being applied to the negative or inverting input of the subtracting circuit 33. Therefore, the doubly amplified component of the frequency $f_1$ is subtracted from the component of the frequency $f_1$ of the reproduced FM luminance signal $Y_{FM}$ applied directly to the positive input of the subtracting circuit 33. Consequently, the component of the frequency $f_1$ of the reproduced FM luminance signal $Y_{FM}$ is inverted at the output of the subtracting circuit 33.

e. Particular structure of the phase inverting circuit

Figure 17:
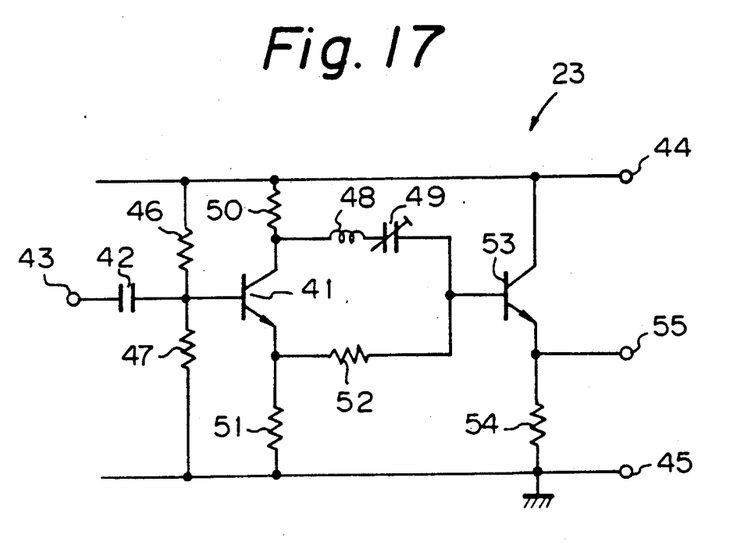
FIG. 17 is a circuit diagram showing a specific arrangement of a phase inverting circuit that may be included in the circuit of FIG. 16.

FIG. 17 shows a practical circuit arrangement for the phase inverting circuit 23, and in which the base of a transistor 41 is connected through a capacitor 42 to an input terminal 43. Resistances 46 and 47 are connected in series between a power supply terminal 44 and a ground terminal 45. A junction between the series connected resistances 46 and 47 is connected to the base of the transistor 41.

The collector of the transistor 41 is connected to the power supply terminal 44 through a resistance 50, and the collector of the transistor 41 is further connected to one end of a series connection of a coil 48 and a variable capacitor 49. The band-pass filter 31 in FIG. 16 for passing the frequency component of the predetermined frequency $f_1$ is composed of the coil 48 and the capacitor 49. The emitter of the transistor 41 is connected to the ground terminal 45 through a resistance 51 and also is connected to one end of a resistance 52 which, at its other end, is connected to the base of a transistor 53. The other end of the series connection of the coil 48 and the capacitor 49 is also connected to the base of the transistor 53. The collector of the transistor 53 is connected to the power supply terminal 44, and the emitter of the transistor 53 is coupled to the ground terminal 45 through a resistance 54. The emitter of the transistor 52 is further connected to an output terminal 55.

The reproduced FM luminance signal $Y_{FM}$ is supplied to the base of the transistor 41 from the input terminal 43. Such FM signal is output from the emitter of the transistor 41, and the FM signal is inverted and output from the collector of the transistor 41. The gain of the signal output from the collector of the transistor 41 is determined by the resistances 50 and 51.

The FM signal derived at the emitter of the transistor 41 is supplied to the base of the transistor 53 through the resistance 52. The inverted FM signal provided at the collector of the transistor 41 is also supplied to the base of the transistor 53 through the band-pass filter consisting of the coil 48 and the capacitor 49. Therefore, an FM signal whose component of the frequency $f_1$ is inverted is provided at the emitter of the transistor 53, and hence at the output terminal 55.

f. Examples of application of the invention

In the above described embodiment, the carrier frequency corresponding to the sync tip level is selected to be 4.2 MHz and the carrier frequency corresponding to the white peak level is selected to be 5.4 MHz in the low-band mode (FIG. 4A), whereas, the carrier frequency corresponds to the sync tip level is selected to be 5.7 MHz and the carrier frequency corresponding to the white peak level is selected to be 7.7 MHz in the high-band mode (FIG. 4B). However, this invention is also applicable to the cases where other carrier frequencies are used. For example, the invention can be similarly applied to the case where the carrier frequency for the sync tip level is selected to be 4.4 MHz and the carrier frequency for the white peak level is selected to be 5.6 MHz in the low-band mode, which is one example of a standard for a ½-inch VTR, while the carrier frequency for the sync tip level is selected to be 6.8

MHz and that for the white peak level is selected to be 8.6 MHz in the high-band mode. Another example to which the invention can be applied is the case where the carrier frequency for the sync tip level is selected to be 3.4 MHz and that for the white peak level is selected to be 4.4 MHz in the low-band mode (which is another example of a standard for a ½-inch VTR), while the carrier frequency for the sync tip level is selected to be 5.4 MHz and that for the white peak level is selected to be 7.0 MHz in the high-band mode.

By way of summary, it is to be noted that, in accordance with this invention, when a mode is to be decided upon or identified from the level of the signal component of the reproduced FM luminance signal having a predetermined frequency $f_1$, which for example, corresponds to the sync tip level in the low-band mode, such signal component of the frequency $f_1$ of the reproduced FM luminance signal is inverted and its amplitude component is eliminated by a limiter so as to suppress sideband components with the frequency $f_1$. In this way, there is provided a reproduced FM modulation luminance signal whose sideband components with the frequency $f_1$ are suppressed, so that, when the lower sideband in the high-band mode coincides with the frequency $f_1$, an erroneous mode decision or identification does not take place.

Having specifically described preferred embodiments of the invention with reference to the accompanying drawings, it is to be understood that the invention is not limited to such embodiments, and that various changes and modifications may be effected therein by one skilled in the art, without departing from the scope or spirit of the invention, as defined in the appended claims.

What is claimed is:

1. A recording mode identifying circuit for determining whether a reproduced FM signal is of a first mode in which recording is effected with frequency modulation of a first carrier having a first center frequency by a level of an information signal or of a second mode in which recording is effected with frequency modulation of a second carrier having a second center frequency by the level of the information signal, said mode identifying circuit comprising:

phase inverting means for inverting a predetermined frequency component of a reproduced FM signal which corresponds to the frequency of one of said first and second carriers when modulated by a predetermined value of said level of the information signal;

limiter means for eliminating an amplitude component of an output of said phase inverting means; and level detecting means for detecting a level of said predetermined frequency component in the reproduced FM signal which has had said predetermined frequency component inverted and said amplitude component eliminated, whereby the mode with which said reproduced FM signal was recorded is determined from said level detected by said level detecting means.

2. A recording mode identifying circuit as in claim 1; wherein said information signal which frequency modulates either said first carrier or said second carrier in said first and second modes, respectively, is a video signal.

3. A recording mode identifying circuit as in claim 1; further comprising mode display means on which the mode of the reproduced FM signal, as determined from said detected level, is displayed.

4. A recording mode identifying circuit as in claim 1; wherein said phase inverting means includes band pass filter means for receiving said reproduced FM signal and adapted to pass said predetermined frequency component thereof, amplifying means for receiving said predetermined frequency component passed by said band pass filter means and operative to effect a two-fold amplification thereof, and subtracting means for subtracting the two-fold amplified predetermined frequency component from said reproduced FM signal and, as a result thereof, providing the reproduced FM signal with the phase of said predetermined frequency component inverted therein.

5. A recording mode identifying circuit as in claim 1; wherein said information signal is a luminance signal component of a color video signal, and said predetermined frequency component of the reproduced FM signal substantially corresponds to a sync tip level of the video signal.

6. An apparatus for reproducing a color video signal composed of a luminance signal and a chroma signal and which is recorded on a magnetic tape either according to a first mode in which recording is effected with frequency modulation of a first carrier having a first center frequency by said luminance signal or according to a second mode in which recording is effected with frequency modulation of a second carrier having a second center frequency by said luminance signal, said apparatus comprising:

magnetic head means for reproducing said color video signal recorded on the magnetic tape;

separation circuit means for separating the reproduced color video signal from said magnetic head means into an FM luminance signal and a chroma signal;

processing circuit means for processing the separated chroma signal;

FM demodulation means which is selectively operative in a first mode or a second mode for demodulating the separated FM luminance signal when the color video signal is recorded in said first mode or said second mode, respectively;

de-emphasis means for de-emphasizing the demodulated luminance signal from said FM demodulation means;

a recording mode identifying circuit for determining whether said reproduced color video signal is of said first mode or said second mode and which include phase inverting means for inverting a predetermined frequency component of a separated FM luminance signal which corresponds to the frequency of one of said first and second carriers when modulated by a predetermined level of the luminance signal, limiter means for eliminating an amplitude component of an output of said phase inverting means, and level detecting means for detecting a level of said predetermined frequency component in the separated FM luminance signal which has had said predetermined frequency component inverted and said amplitude component eliminated, whereby the one of said first and second modes with which said reproduced color video signal was recorded is identified from said level detected by said level detecting means; and system control means responsive to an identification of said one of the first and second modes with which the reproduced color video signal was recorded for selectively operating said FM demodulating means in said one of said first and second modes.

7. An apparatus according to claim 6; wherein said de-emphasis means is selectively operable in a first mode or a second mode for de-emphasizing the demodulated luminance signal when the color video signal is recorded in said first mode or said second mode, respectively, and said system control means is responsive to said identification that the reproduced color video signal was recorded with said first mode or said second mode for selectively operating said de-emphasis means in said first mode or said second mode, respectively, thereof.

8. An apparatus according to claim 6; further comprising mode display means on which the mode of the reproduced color video signal, as identified from said detected level, is displayed.

9. An apparatus according to claim 6; wherein said phase inverting means includes band pass filter means receiving said separated FM luminance signal and adapted to pass said predetermined frequency component thereof, amplifying means receiving said predetermined frequency component passed by said band pass filter means and operative to effect a two-fold amplification thereof, and subtracting means for subtracting the two-fold amplified predetermined frequency component from said separated FM luminance signal and, as a result thereof, providing the FM luminance signal with the phase of said predetermined frequency component inverted therein.

10. An apparatus according to claim 6; wherein said predetermined frequency component of the separated FM luminance component which is inverted substantially corresponds to a sync tip level of the video signal.

* * * * *